United States Patent [19]

Schrank

[11] 3,769,670

[45] Nov. 6, 1973

[54] METHOD OF SUPPRESSING HYDROGEN ABSORPTION IN TUNGSTEN FILAMENTS

[75] Inventor: Martin P. Schrank, Ipswich, Mass.

[73] Assignee: GTE Sylvania Incorporated, Danvers, Mass.

[22] Filed: May 8, 1972

[21] Appl. No.: 251,422

[52] U.S. Cl.................. 29/25.11, 148/13.1, 313/223
[51] Int. Cl....................................................... H01j
[58] Field of Search.................... 29/25.11; 313/223; 148/13.1, 20.3, 133

[56] References Cited
UNITED STATES PATENTS
2,809,140   10/1957   Smeaton ........................... 148/13.1
3,453,476   7/1969   English .............................. 313/223

*Primary Examiner*—Richard J. Herbst
*Assistant Examiner*—J. W. Davie
*Attorney*—Norman J. O'Malley et al.

[57] ABSTRACT

Tungsten filaments for incandescent lamps are heated in an atmosphere of hydrogen bromide at a temperature of at least about 1,500°C in order to suppress hydrogen absorption by the tungsten.

1 Claim, No Drawings

METHOD OF SUPPRESSING HYDROGEN ABSORPTION IN TUNGSTEN FILAMENTS

BACKGROUND OF THE INVENTION

1. Field Of The Invention

This invention relates to tungsten filaments for use in incandescent lamps.

2. Description Of The Prior Art

Incandescent lamp filaments are generally made of tungsten wire because of, among other things, the high melting point of tungsten and the workability of the drawn metal. Methods of manufacturing tungsten wire and filaments are shown in U.S. Pat. Nos. 1,082,933, 1,410,499, 3,262,293 and 3,649,224.

Because tungsten readily oxidizes when heated, it is necessary to use reducing atmospheres, such as hydrogen, throughout the process of manufacturing tungsten wire and filaments. As a result, absorbed or dissolved hydrogen is almost always present in tungsten filaments.

In some applications, such hydrogen can be detrimental to filament life by causing filament embrittlement. Also, in quartz-halogen incandescent lamps, hydrogen liberated from the filament during lamp operation can interfere with the regenerative cycle of the halogen, thereby reducing lamp life.

Hydrogen can be removed from a tungsten filament by heating the filament to a high temperature in a vacuum. However, after such a cleaning process, the tungsten is readily absorptive and can absorb hydrogen merely by exposure to the atmosphere.

An object of this invention is to reduce the absorbency of tungsten filaments for hydrogen.

SUMMARY OF THE INVENTION

A filament for an incandescent lamp is coiled from drawn tungsten wire by processes well-known in the art. However, before the filament is mounted in an incandescent lamp, it is placed in a chamber the atmosphere of which can be controlled and it is heated to a temperature of at least about 1,500°C in an atmosphere of hydrogen bromide. This treatment markedly reduces the absorbency of the tungsten for hydrogen and increases the life of said incandescent lamp.

DESCRIPTION OF THE PREFERRED EMBODIMENT

Apparatus for the measurement of hydrogen content of tungsten filaments consisted of a vacuum chamber into which controlled amounts of various gases could be introduced. It also had provisions to heat the filament and measure its hydrogen content. A mass spectrometer connected to the chamber was the measuring instrument for said hydrogen content.

Two groups of tungsten filaments for 650 watt DVY projection lamps were compared for hydrogen absorbency. Group A was the control group, that is, filaments manufactured in accordance with prior art methods that were ready for mounting in said projection lamps. Group B consisted of filaments that had been previously heated to a temperature of about 1,500°C for about 10 minutes in an atmosphere at a pressure of 150 Torr, the atmosphere consisting of 1.3 percent hydrogen bromide and 98.7 percent nitrogen.

Both groups of filaments were placed in said chamber containing deuterium at a pressure of 25 Torr and were heated to a temperature of 1,300°C for periods of time varying from 25 minutes to 15 hours. Deuterium is an isotope of hydrogen and was used in order to obtain accuracy in the measurement of hydrogen absorbency of the filaments.

The hydrogen absorbency of Group A filaments was between 2.5 and 4 ppm while that of Group B filaments was less than 0.2 ppm.

In another experiment a group of filaments was heated in an atmosphere of hydrogen, nitrogen and hydrogen bromide at a temperature of 1,500°–1,600°C and a pressure of 157 Torr for about 20 minutes. This atmosphere consisted of 1.2 percent hydrogen bromide, 4.8 percent hydrogen and 94 percent nitrogen. The hydrogen absorbency of these filaments was only 0.24 ppm as compared with 4.3 ppm for a control group of filaments. Thus, even though the treatment atmosphere contained only 1.2 percent hydrogen bromide and contained 4 times as much hydrogen, the hydrogen absorbency of the tungsten filaments was still markedly reduced.

The exact reason for the reduction of hydrogen absorbency by treatment with hydrogen bromide is not known but it is believed that the bromine preferentially occupies lattice sites in the tungsten, thereby reducing the absorbency thereof for hydrogen.

I claim:

1. The process of manufacturing tungsten filaments for incandescent lamps from tungsten wire, the improvement comprising the step of heating said filaments to a temperature of at least 1,500°C in an atmosphere containing hydrogen bromide, prior to mounting said filaments in said lamp.

* * * * *